United States Patent
Kalisz

(10) Patent No.: US 8,328,230 B1
(45) Date of Patent: *Dec. 11, 2012

(54) ACTIVE BOLSTER WITH INTERNAL TEAR RIBS FOR A CONTOURED INFLATION SHAPE

(75) Inventor: Raymond E. Kalisz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,077

(22) Filed: Jan. 30, 2012

(51) Int. Cl.
*B60R 21/16* (2006.01)

(52) U.S. Cl. ..................................... 280/730.1

(58) Field of Classification Search ............... 280/730.1, 280/751, 752
See application file for complete search history.

(56) References Cited

U.S. PATENT DOCUMENTS

| | | | | |
|---|---|---|---|---|
| 5,823,602 A * | 10/1998 | Kelman et al. | | 296/70 |
| 6,302,437 B1 * | 10/2001 | Marriott et al. | | 280/732 |
| 6,619,689 B2 * | 9/2003 | Spencer et al. | | 280/730.1 |
| 6,786,524 B2 * | 9/2004 | Tamura | | 296/37.12 |
| 6,817,627 B2 * | 11/2004 | Galmiche et al. | | 280/730.1 |
| 7,338,075 B2 * | 3/2008 | Ellison et al. | | 280/752 |
| 7,441,806 B2 | 10/2008 | Ellison | | |
| 2006/0038390 A1 * | 2/2006 | Cho | | 280/752 |
| 2011/0316300 A1 | 12/2011 | Kalisz | | |
| 2012/0112439 A1 * | 5/2012 | Roychoudhury | | 280/728.3 |

FOREIGN PATENT DOCUMENTS

| | | |
|---|---|---|
| JP | 5213129 A | 8/1993 |
| WO | WO9704992 | 2/1997 |
| WO | WO0032447 | 6/2000 |

OTHER PUBLICATIONS

Roychoudhury, et al, Blow-Molded Plastic Active Knee Bolsters, SAE Technical Paper Series 2004-01-0844, Mar. 8-11, 2004.

* cited by examiner

*Primary Examiner* — Faye M. Fleming
(74) *Attorney, Agent, or Firm* — Raymond L. Coppiellie; MacMillan, Sobanski & Todd, LLC

(57) ABSTRACT

An active bolster for protecting an occupant during a crash event of a motor vehicle includes a back wall and a front wall forming an inflatable bladder. Frangible tear ribs are provided in a central region to limit expansion so a surrounding region expands by a greater distance toward the occupant prior to tearing of the tear ribs providing a contoured shape during inflation deflecting a portion of an impacting occupant toward the central region. The tear ribs separate after a predetermined amount of inflation to provide a cushion in the central region.

8 Claims, 4 Drawing Sheets

ACTIVE BOLSTER WITH INTERNAL TEAR RIBS FOR A CONTOURED INFLATION SHAPE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to preventing an impacting occupant from sliding off of an active bolster instead of being cushioned by it.

An active bolster is a vehicle occupant protection device with a gas-inflatable bladder to absorb impacts and reduce trauma to occupants during a crash. As opposed to deploying air bag cushions through various openings, active bolsters use the interior trim surface itself to expand at the beginning of a crash event for absorbing the impact and dissipating energy through the action of an inflation gas. Co-pending application publication US2011/0316300A1, filed Jun. 26, 2010, entitled "Active Knee Bolster for Automotive Vehicle," which is incorporated herein by reference in its entirety, discloses an active knee bolster integrated into a glove box door that is light weight and visually attractive.

In a typical structure, an active bolster includes a front wall or panel that faces a vehicle occupant and that attaches to a back wall or panel along a sealed periphery. One or both of the walls is deformable in order to provide an inflatable bladder. The walls are initially spaced apart while in their non-inflated condition. This allows ingress of the inflation gas in a manner that achieves an even inflation across the panel.

The front and back walls of a typical active bolster are comprised of molded thermoplastics such as polyethylene, polyolefin, or PVC. They can be blow molded or injection molded. As a result of having spaced apart walls, an "oil-canning" effect can become a problem. Oil canning is the springing in and out of a flat panel perpendicular to the plane of the panel. In addition to creating a drum-like noise, oil canning is undesirable because it gives a perception of lack of structural quality and integrity. Furthermore, vibrations during operation of a vehicle may become concentrated at the bolster, thereby creating additional noise. As disclosed in co-pending U.S. application publication number US2011/0316300A1, the inner field of the bladder walls may contain a plurality of interconnections to improve rigidity and avoid oil canning. Since the front wall moves away from the back or back wall during inflation, the interconnections between the walls must tear or separate during inflation. As previously disclosed, the interconnection between the walls have been made strong enough to avoid oil canning while being weak enough to avoid interfering with or slowing any part of the inflation.

Since the typical bladder formed by the front and back walls of the bolster is relatively flat and is joined around the periphery by a seal that remains unbroken, a greater amount of expansion (i.e., movement of the cushioning surface toward the occupant) has been produced at the center of the bladder than at the periphery. Thus, the edges of the inflating bladder have been sloped such that the impacting body of an occupant may tend to slide away from the bolster if the main impact occurs at the edges. In order to avoid this problem, the overall area of coverage (e.g., width) of the active bolster has been made large enough to contain all expected impact points to be within the edges of the bolster based on the potential sizes and positions of occupants. However, an extra size of the bolster increases its cost and constrains the styling and appearance that can be designed into the automotive interior.

SUMMARY OF THE INVENTION

In one aspect of the invention, an active bolster is provided for protecting an occupant in an automotive vehicle during a crash event. A back wall mounts against a rigid structure of the vehicle. A front wall overlies the back wall and forms an interior trim piece of the vehicle. The back wall has a first surface facing the front wall, and the front wall has a second surface facing the back wall. The back wall and front wall are comprised of molded plastic components, and the back wall and front wall are joined around a periphery to form an inflatable bladder with an initial open space between the first and second surfaces. The back wall is formed with at least one pleat disposed along the periphery, wherein the pleat unfolds during inflation of the bladder to permit expansion of the front wall toward the occupant. The front wall includes a plurality of tear ribs extending from a central region of the second surface and joined to the first surface of the back wall in a manner that tears after a predetermined amount of inflation of the bladder. The tear ribs limit expansion at the central region with respect to a surrounding region of the front wall between the central region and the periphery without any tear ribs, so that the surrounding peripheral region expands by a greater distance toward the occupant prior to the predetermined amount of inflation resulting in a contoured shape during inflation that deflects a portion of an impacting occupant toward the central region. The tear ribs separate from the back wall after the predetermined amount of inflation so that the central region expands to provide a cushion to the portion of the impacting occupant.

DETAILED DESCRIPTION OF PREFERRED EMBODIMENTS

Figure 1:
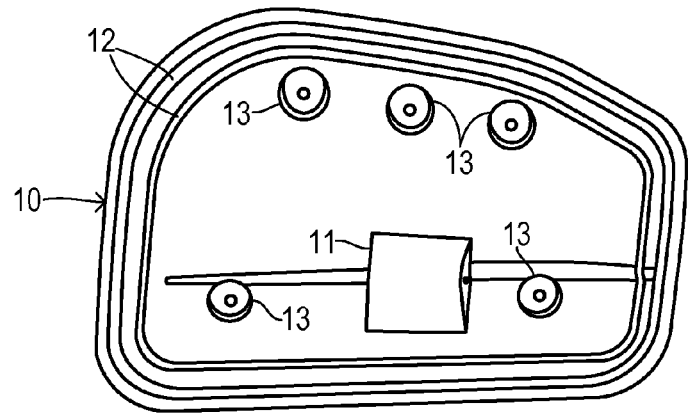
FIG. 1 is a plan view of the internal surface of a back wall for forming a bladder.
Figures 2, 3:
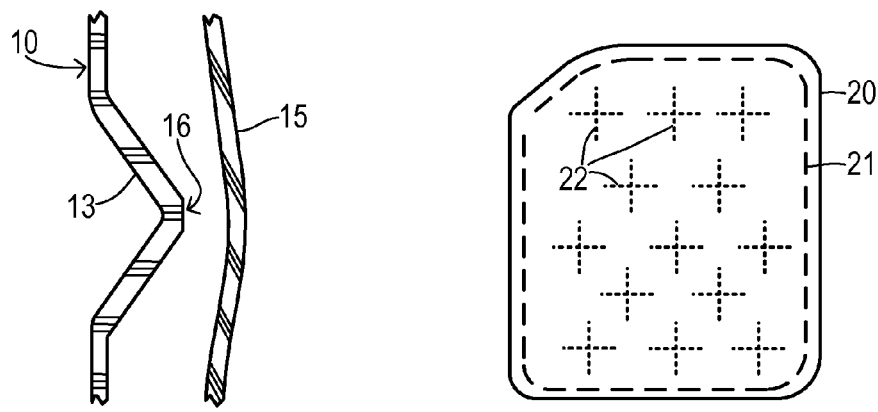
FIG. 2 is a side cross section through the front and back walls after separation of an anti-oil-canning joint.
FIG. 3 is a front view of a bolster showing placement of anti-oil-canning joints deployed evenly across a bolster.

Referring now to FIG. 1, a prior art base or back wall 10 for forming one-half of an inflatable bladder is seen from its forward-facing (i.e., inner) side. A holder 11 receives a canister containing pressurized inflation gas (not shown). Circumferential ribs 12 are provided around the periphery of back wall 10 for being welded to a front wall (not shown) to create a hermetically sealed inflation chamber between the walls. Such a hermetic seal is disclosed in copending U.S. application Ser. No. 13/089,401, filed Apr. 19, 2011, entitled "Active Bolster with Hermetic Seal" which is incorporated herein by reference in its entirety. Projections 13 extend from back wall 10 for joining with the front wall via frangible connections as described in copending application US2011/0316300A1 to provide stability and avoid oil-canning. FIG. 2 shows back wall 10 and a front wall 15 after inflation of the bladder. A frangible weld connection between projection 13 and front wall 15 has been torn during inflation so that a surface 16 has separated from front wall 15. The strength of the frangible weld as created in the prior art has been sufficiently weak that it would tear before it could create any change in the deployment shape of front wall 15, since the interconnection only needed to prevent oil-canning or other movement before the bladder was inflated.

Figure 4:
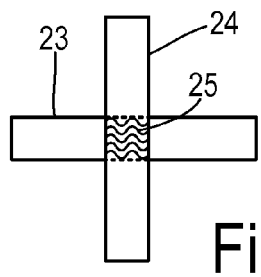
FIG. 4 shows a prior art orientation of crossing blocks for providing the anti-oil-canning joints.

FIGS. 3 and 4 shows another prior art embodiment using frangible connections between the front and back walls to prevent oil-canning as disclosed in co-pending application U.S. Ser. No. 13/075,294, filed Mar. 30, 2011, entitled "Active Bolster with Internal Tear Joints," which is incorporated herein by reference in its entirety. A bolster 20 with front and back walls is joined around a welded periphery 21. A plurality of internal tear joints 22 are each comprised of mated pairs of upstanding blocks extending from each wall. In each pair, the transversely oriented blocks 23 and 24 meet at an intersection 25 having an area which is just a portion of the size of the blocks. Welds are formed at intersections 25. Spacing of tear joints 22 and the size of each respective weld area are easily controlled by design in a manner that achieves a desired retention force that substantially prevents flexing of the front wall under compression forces prior to deployment and that allows the tear joints to separate under tension during inflation of the bladder without affecting the shape or timing of the expansion of the bladder.

Figure 5A:
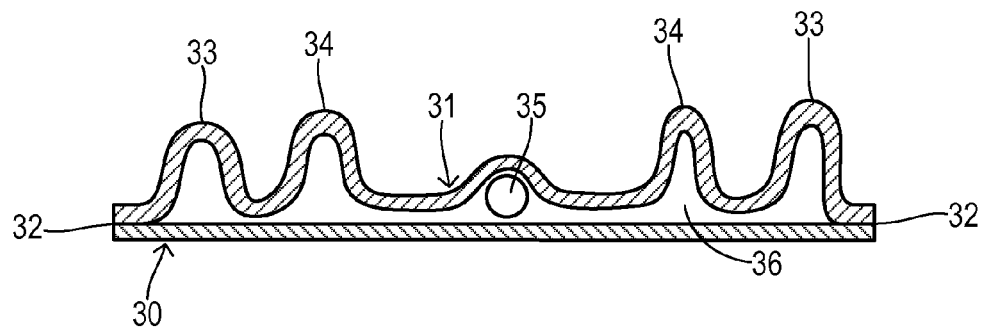
FIGS. 5A and 5B are horizontal cross sections of a prior art active bolster prior to inflation and during inflation, respectively.
Figure 5B:
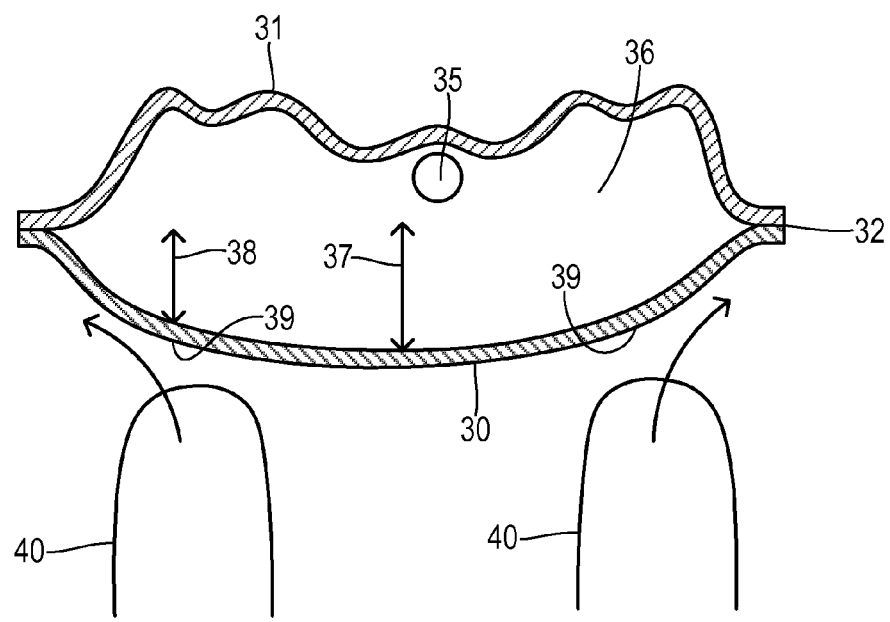

FIGS. 5A and 5B illustrate an expansion of a conventional active bolster. This expansion was produced even with anti-oil-canning joints (not shown) being present. A front wall 30 is joined around its periphery with a back wall 31 by a hermetic seal 32 such as a weld. Walls 30 and 31 may be injection molded. Back wall 31 includes a plurality of pleats 33 and 34 which allow for expansion in the direction of a vehicle occupant when inflation occurs as a result of the release of pressurized gas from a gas canister 35. An initial open space or chamber 36 exists between wall 30 and 31 prior to expansion (FIG. 5A). During inflation as shown in 5B, an expansion distance 37 at a central region of the bolster is greater than an expansion distance 38 at a surrounding region between the central region and the periphery. The differential expansion creates a sloped surface 39 on front wall 30. If knees 40 are moving forward during an impact event, then instead of obtaining a full cushioning effect, knees 40 may slide off of front wall 30.

Figure 6A:
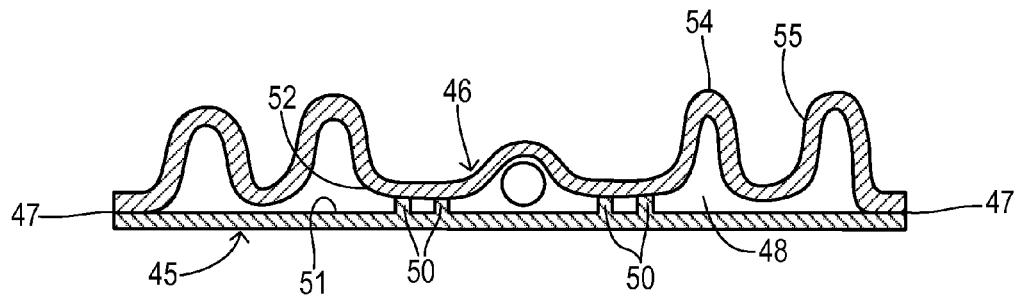
FIG. 6A is a horizontal cross section of an active bolster of the present invention during inflation.
Figure 6B:
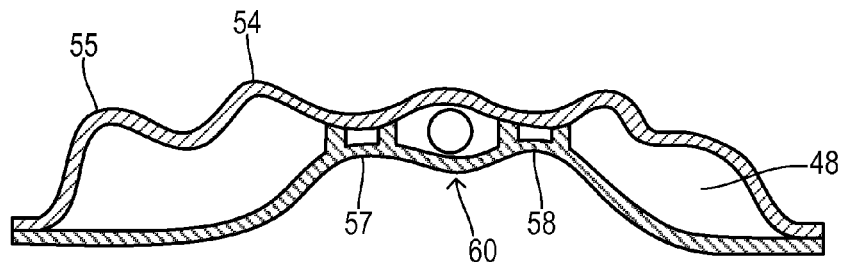
FIGS. 6B and 6C show the active bolster during inflation.
Figure 6C:
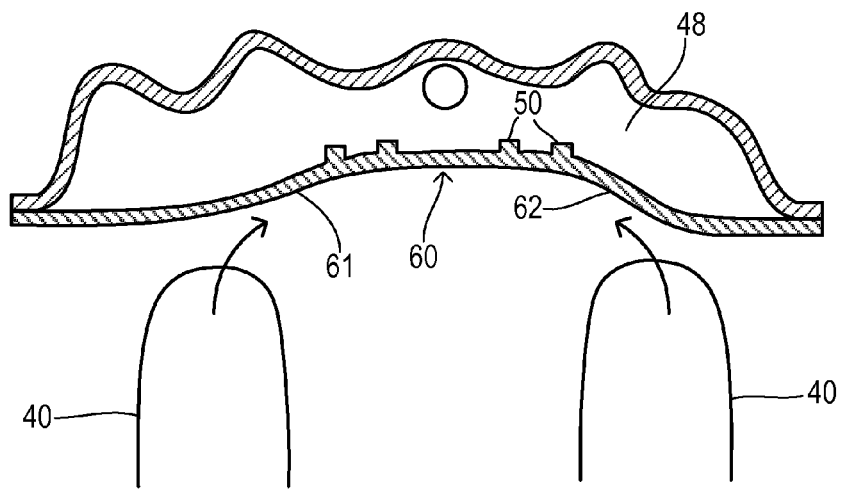

The present invention employs longitudinally-extending tear ribs requiring a higher tearing force than prior oil-canning joints in order to create a contoured shape during expansion and to capture an occupant during an impact as shown in FIGS. 6A-6C. A front wall 45 is joined to a back wall 46 around their periphery by a weld 47 to create a chamber 48. A plurality of tear ribs 50 extend in a central region from an interior surface 51 of front wall 45 toward an interior surface 52 of back wall 46. Tear ribs 50 are joined to surface 52 of back wall 46 in a manner that tears only after a predetermined amount of bladder inflation occurs. The required retention force is readily tailored by controlling the contact area of tear ribs 50 and the particulars of the attachment. For example, when a plastic weld is used (e.g., vibration welding or hot plate welding), then the extent of melting and/or the depth of penetration can be manipulated along with the contact area to achieve the desired force. Adhesives could also be used to join tear ribs 50 to back wall 46, with a particular adhesive being selected based on its adhesion strength.

In the initial, pre-deployed state shown in FIG. 6A, back wall 46 includes pleats 54 and 55 while front wall 51 is flat or smoothly curved depending upon the styling of the interior trim surface of the vehicle. When inflation begins in FIG. 6B, chamber 48 expands and pleats 54 and 55 begin to stretch. The peripheral edges of front wall 50 expand toward the occupant, but central regions 57 and 58 opposite tear ribs 50 have not yet expanded because the predetermined amount of inflation has not yet occurred. Once the predetermined amount of inflation is reached, tear ribs 50 separate from back wall 46 and chamber 48 begins to expand in the central region 60 as shown in FIG. 6C. Thus, cushioning is provided at the time of occupant impact across the full face of front wall 50 including central region 60. However, since the surrounding peripheral region initially expands by a greater distance toward the occupant, a contoured shape is present during at least a portion of the inflation time so that sloped surfaces 61 and 62 within central region 60 tend to bring the occupant (e.g., knees 40) toward the center of the bolster. A portion of an impacting occupant deflects toward central region 60 so that the cushioning effect of the bolster is applied against the occupant.

Figure 7:
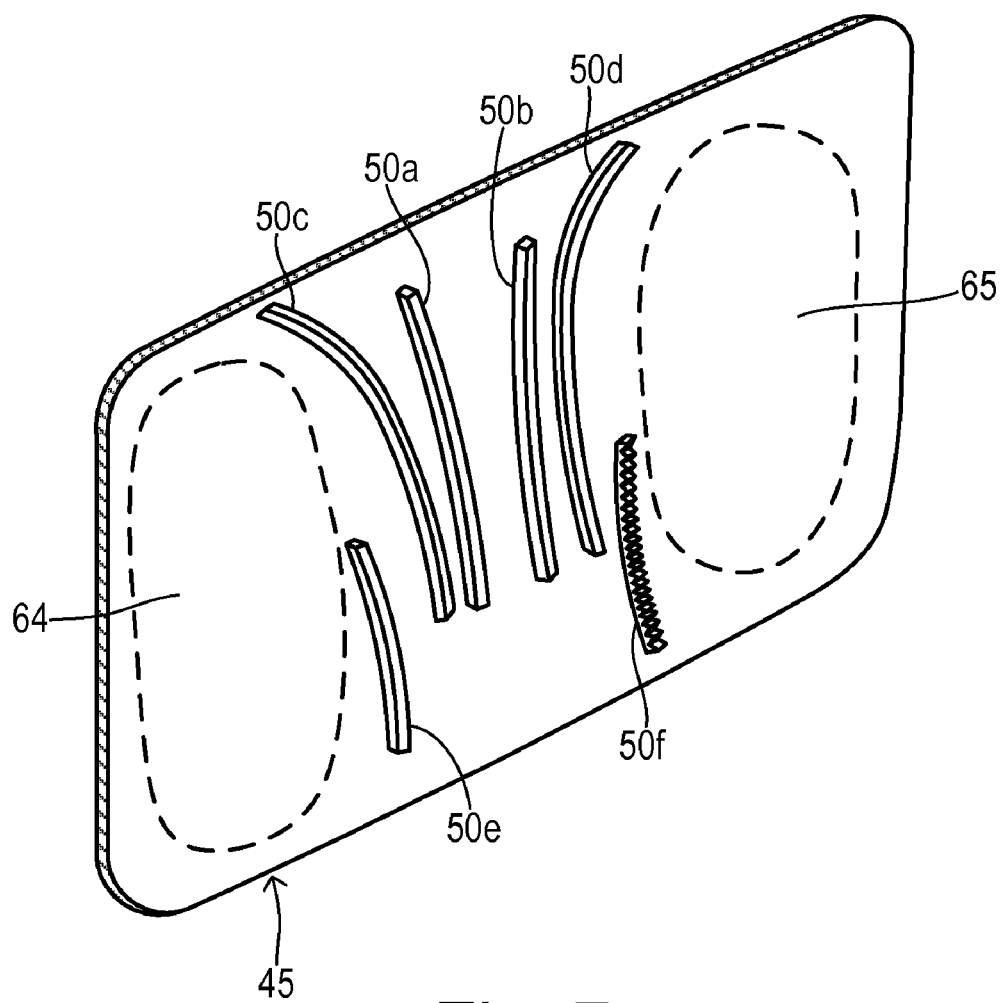
FIG. 7 is a perspective view of an inner side of the front wall of one embodiment of the invention.

Tear ribs 50 extend longitudinally across the central region as shown in FIG. 7. Symmetrically placed ribs 50a-50f preferably extend generally vertically and are generally parallel to one another. They may also include a slight curvature that is generally concentric with a pair of knee impact zones 64 and 65. By virtue of their generally vertical direction, ribs 50a-50f provide a lower resistance to vertical bending than to horizontal bending of the central region after tearing. Thus, the central depression in the central region is maintained for a longer time after separation of tear ribs 50, thereby providing better capturing of the knees.

Tear ribs 50 may be continuously flat as shown by ribs 50a-50e. Other shapes or profiles along the length of the ribs are also possible, such as a toothed rib 50f. Using different profiles along different portions of the ribs provides additional flexibility in controlling the tear resistance and consequently the contoured shape during inflation.

What is claimed is:

1. An active bolster for protecting an occupant in an automotive vehicle during a crash event, comprising:
   a back wall for mounting against a rigid structure of the vehicle; and
   a front wall overlying the back wall and forming an interior trim piece of the vehicle;
   wherein the back wall has a first surface facing the front wall, and the front wall has a second surface facing the back wall;
   wherein the back wall and front wall are comprised of molded plastic components, and the back wall and front wall are joined around a periphery to form an inflatable bladder with an initial open space between the first and second surfaces;
   wherein the back wall is formed with at least one pleat disposed along the periphery, wherein the pleat unfolds during inflation of the bladder to permit expansion of the front wall toward the occupant;

wherein the front wall includes a plurality of tear ribs extending from a central region of the second surface and joined to the first surface of the back wall in a manner that tears after a predetermined amount of inflation of the bladder;

wherein the tear ribs limit expansion at the central region with respect to a surrounding region of the front wall between the central region and the periphery without any tear ribs, so that the surrounding peripheral region expands by a greater distance toward the occupant prior to the predetermined amount of inflation resulting in a contoured shape during inflation that deflects a portion of an impacting occupant toward the central region; and wherein the tear ribs separate from the back wall after the predetermined amount of inflation so that the central region expands to provide a cushion to the portion of the impacting occupant.

2. The active bolster of claim 1 wherein the back wall and front wall are comprised of flexible plastic material, and wherein the tear ribs comprise a weld for frangibly joining the tear ribs to the back wall.

3. The active bolster of claim 2 wherein the weld is comprised of a vibration weld.

4. The active bolster of claim 1 wherein each tear rib extends along a substantially vertical direction, providing a lower resistance to vertical bending than to horizontal bending of the central region after tearing.

5. The active bolster of claim 1 wherein the bolster is an active knee bolster, and wherein the contoured shape provides a pair of knee-capture regions between the central region and the periphery.

6. The active bolster of claim 1 wherein the back wall and front wall are formed by injection molding.

7. The active bolster of claim 1 wherein the back wall and front wall are joined around the periphery by a sealing weld.

8. An active bolster comprising:

a back wall;

a front wall forming an inflatable bladder with the back wall;

frangible tear ribs in a central region to limit expansion so a surrounding region expands by a greater distance toward the occupant prior to tearing of the tear ribs providing a contoured shape during inflation deflecting a portion of an impacting occupant toward the central region, the tear ribs separating after a predetermined amount of inflation.

\* \* \* \* \*